No. 772,415. PATENTED OCT. 18, 1904.
F. JACKSON.
BATTERY HOLDER.
APPLICATION FILED MAR. 4, 1904.
NO MODEL. 3 SHEETS—SHEET 1.
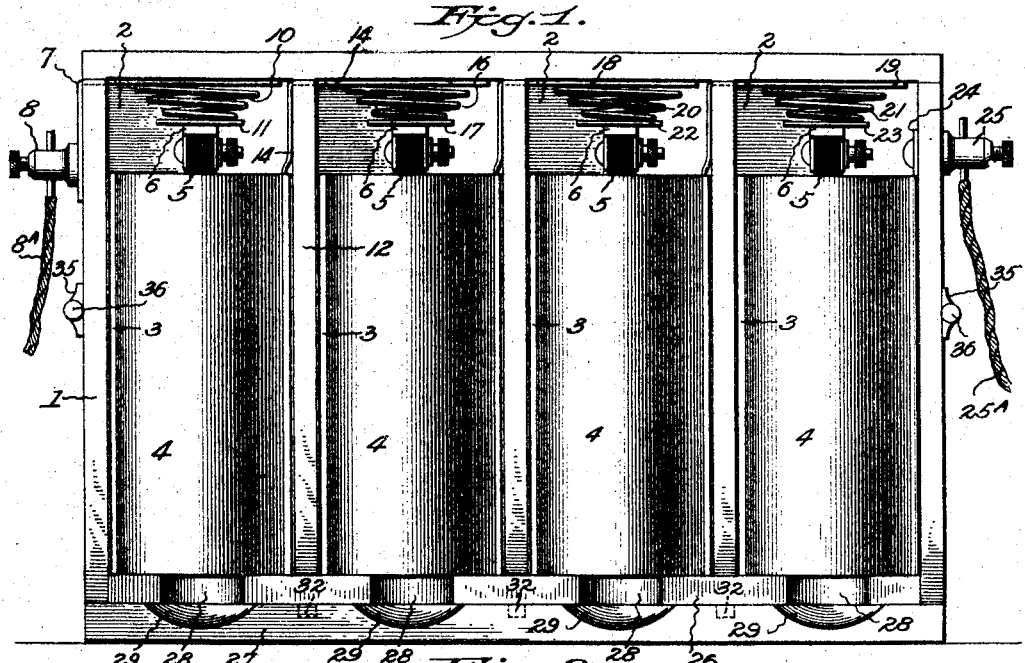
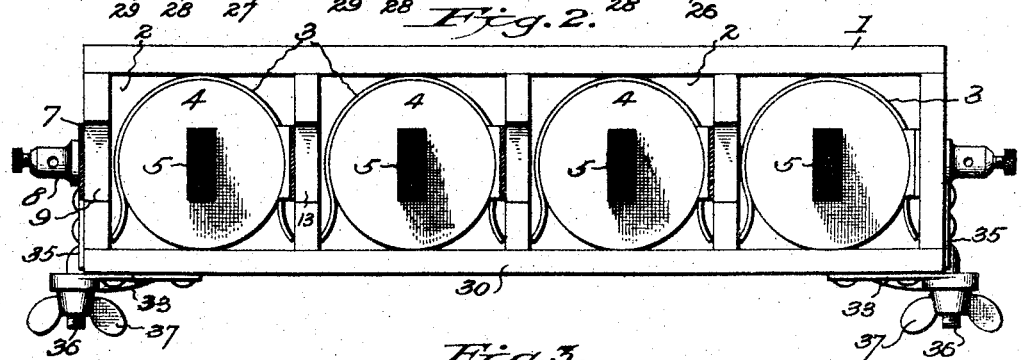
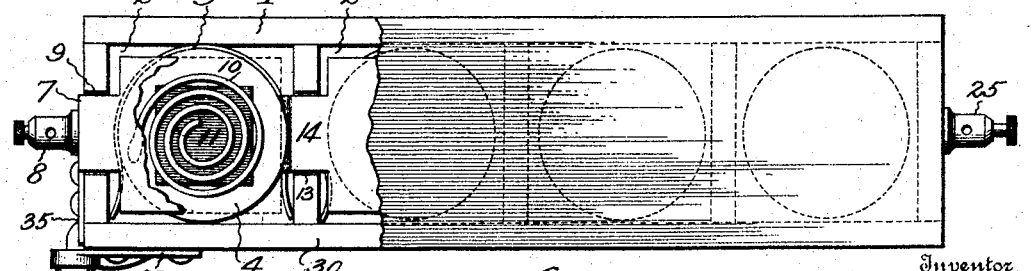
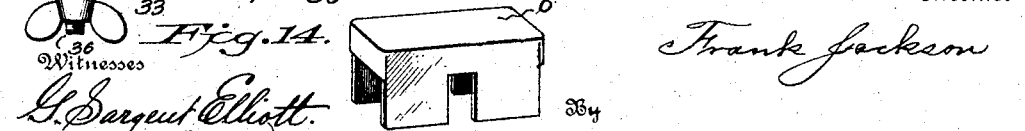
Inventor
Frank Jackson
By H. S. Bailey.
Attorney
Witnesses
G. Sargent Elliott.
Bessie Thompson No. 772,415. PATENTED OCT. 18, 1904.
F. JACKSON.
BATTERY HOLDER.
APPLICATION FILED MAR. 4, 1904.
NO MODEL. 3 SHEETS—SHEET 2.
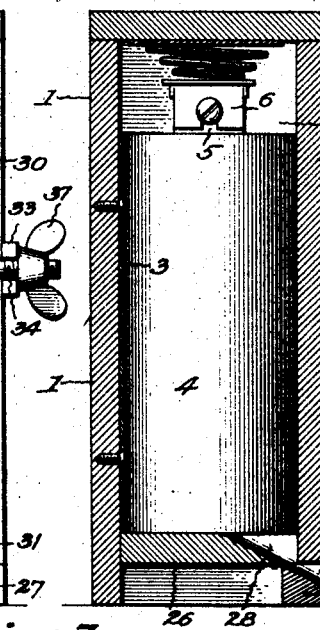
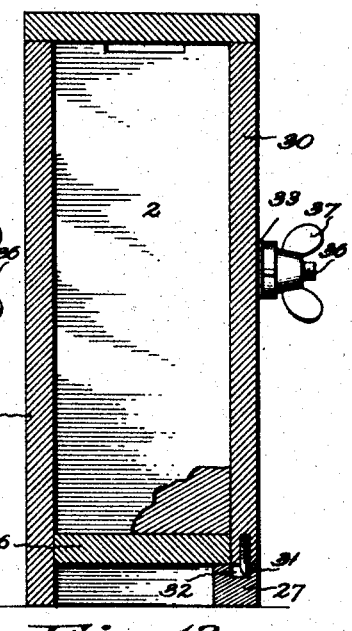
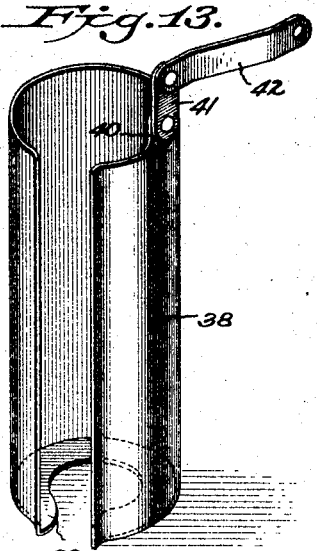
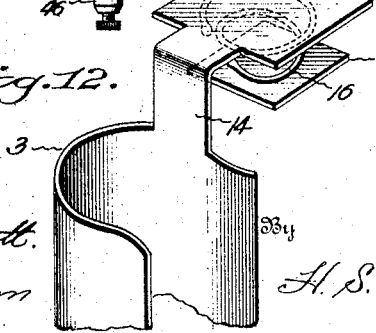
Witnesses
G. Sargent Elliott.
Bessie Thompson
Inventor
Frank Jackson
By H. S. Bailey.
Attorney

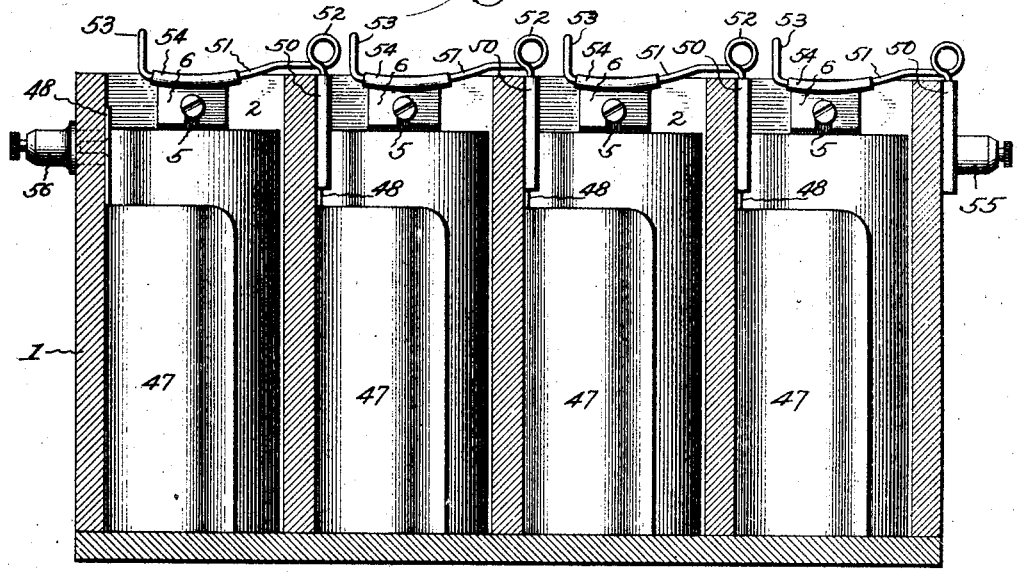
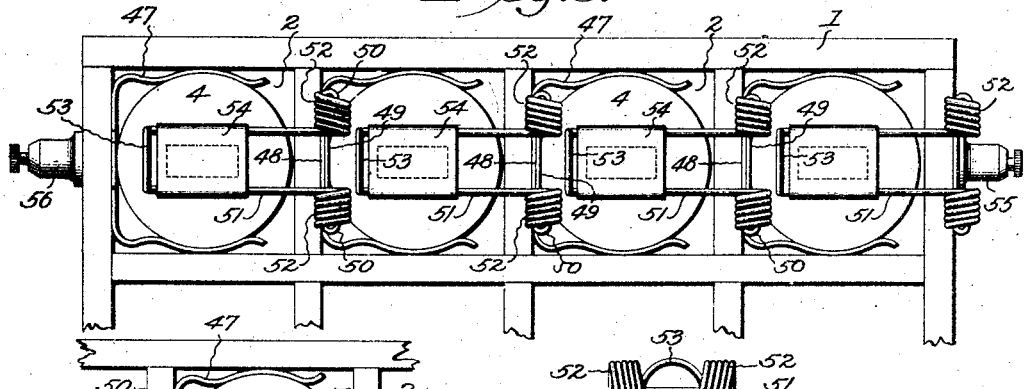
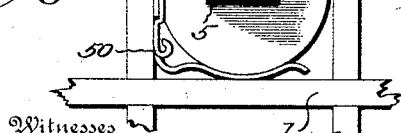
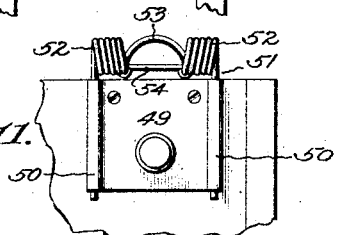

No. 772,415.  
Patented October 18, 1904.

UNITED STATES PATENT OFFICE.

FRANK JACKSON, OF DENVER, COLORADO.

BATTERY-HOLDER.

SPECIFICATION forming part of Letters Patent No. 772,415, dated October 18, 1904.

Application filed March 4, 1904. Serial No. 196,548. (No model.)

*To all whom it may concern:*

Be it known that I, FRANK JACKSON, a citizen of the United States of America, residing in the city and county of Denver and State of Colorado, have invented certain new and useful Improvements in Battery-Holders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in spark-generating-battery holders and attachments therefor used in connection with gasolene or other vapor operated automobiles.

The object of my invention is to provide for instantaneously connecting the batteries in their spark-producing circuit without the necessity of wiring the several batteries to each other, thus enabling a person to withdraw a battery from the holder or replace the same without the time and bother consequent upon connecting and disconnecting wires, the batteries being maintained in positive connection with each other and with the holder, the said holder being connected by wire with the cylinder of the engine in the usual manner, the current through the batteries and cylinder being utilized to intermittently produce a spark in the cylinder by the well-known circuit making and breaking mechanism.

The invention further consists in means for securely holding the several batteries in the holder or casing, so as to prevent their rattling or shaking when the vehicle is in motion.

These objects are attained by the mechanism illustrated in the accompanying drawings, in which—

Figure 1 is a front elevation of the preferred form of the improved battery-holder, the cover or door being removed to show the batteries in position. Fig. 2 is a plan view of the holder with the top removed, the circuit connections of the batteries being omitted to give an unobstructed view of the metal casings which inclose the batteries. Fig. 3 is also a plan view of the holder, a part of the top being broken away to illustrate the manner of connecting the batteries with each other. Fig. 4 is an end elevation of the holder. Fig. 5 is a vertical transverse section through one of the compartments of the holder, a battery being in place and its metal casing being secured to the back of the holder by screws. Fig. 6 is also a transverse vertical section through a compartment of the holder, the battery and its casing being removed and a pin being shown in the lower edge of the door or cover which projects into an opening in the side of the holder and assists in holding the said door in place. Fig. 7 is a view of a modified form of the holder, showing a different manner of connecting the batteries. Fig. 8 is a vertical longitudinal sectional view of still another form of holder and means for connecting the batteries. Fig. 9 is a plan view thereof. Fig. 10 is a fragmentary plan view of the form of holder illustrated in Figs. 9 and 10, the spring-actuated plate which connects one battery with another being omitted. Fig. 11 is an end view of a fragment of this form of holder, showing the manner of securing the spring to which the contact-plate is secured. Fig. 12 is a perspective view of the form of battery-casing and contact illustrated in Figs. 1, 3, and 5. Fig. 13 is a perspective view of the form of casing shown in Fig. 7, and Fig. 14 is a perspective view of a metal cap which is secured upon the projecting end of the carbon of each battery.

Gasolene or other vapor operated automobiles use a sparking device for igniting the vapor at each alternate stroke of the engine-piston. The device in common use consists of a plurality of dry batteries, inclosed in a suitable box or holder, connected in a circuit with the piston-chamber of the engine, the battery box or holder being suitably secured to any convenient part of the automobile. The batteries as at present employed are connected by wires in the ordinary manner, and to disconnect a spent battery and replace it with a fresh one requires a considerable expenditure of time and inconvenience, and my present device is designed to overcome these objections.

In the accompanying drawings the numeral 100

1 refers to a suitable box which is divided into compartments 2, the compartments being preferably arranged in two rows of four compartments each or two rows of six compartments each, though any preferred number of compartments may be employed. Each compartment is provided with a metal casing or jacket 3, which is designed to partially inclose an ordinary dry battery 4. These jackets are open on one side, as clearly shown in Figs. 2 and 12, and are of slightly less diameter than the battery, so that they must be sprung in order to insert a battery, which is thus tightly inclosed by the jacket and contacts with every part of it and is also held against lateral movement. The jacket is preferably the same height as the battery and is suitably secured to the box. Upon the projecting end of the carbon 5 of each battery I preferably secure a metal cap 6 (see Fig. 14) by means of a screw and thumb-nut, though the cap may be dispensed with, if desired. Upon one end of the box 1—say the left-hand end—is screwed the depending end of a metal conductor-plate 7 by means of a suitable binding-post 8, the threaded shank of which passes through the plate and into the end of the box. At the top of the box this plate 7 is bent at right angles and passes through a recess 9, formed in the upper edge of the end of the box, and into the first compartment. The portion of the plate within the compartment is preferably square and of an area to fit loosely therein. To the under side of the square portion of plate 7 is secured in any suitable manner one end of an expansion coil-spring 10, and to the other end of this spring is secured a contact-plate 11, which rests upon the cap 6 of the battery-carbon or upon the carbon direct where the cap is omitted and is tightly held against either the cap or carbon by the force of the spring 10. The partition 12, between the first and second compartments, is recessed at 13 in its upper edge, and the jacket 3 on its side adjoining the partition is provided with an integral conductor strip or plate 14, which extends to the top of the box and is bent at right angles to pass through the recess 13 of partition 12 and into the second compartment, where it is enlarged, like plate 7, and has secured to its under side a coil-spring 16, to the other end of which is secured a metal contact-plate 17, which is held by spring 16 against either the metal cap or the carbon of the second battery. The jackets 3 of the second and third compartments are provided, respectively, with integral conductor-plates 18 and 19, having coil-springs 20 and 21, to which are secured contact-plates 22 and 23, which are held upon the carbons of the batteries. These various plates and springs are identical in design and in function. The jacket in the last compartment of the series has a short integral tongue 24, which is connected with a binding-post 25 on the outside of that end of the box. The binding-post 8 at the opposite end of the box is connected by a wire $8^A$ with the piston-chamber of the engine, while the binding-post 25 is also connected with the said piston-chamber by a wire $25^A$. Thus a circuit extending through the batteries and piston-chamber is established, the current from the first battery passing through conductor-plate 14, spring 16, and contact 17 to the second battery, thence through plate 18, spring 20, and contact 22 to third battery, thence through plate 19, spring 21, and contact 23 to the fourth battery, through binding-post 25 and wire $25^A$ to sparking mechanism, thence to piston-chamber, through the wire $8^A$ to binding-post 8, and thence to the first battery through plate 7, spring 10, and contact 11. This manner of connecting the batteries with each other is simple and positive, doing away with the present troublesome wiring system and providing for instantaneously connecting and disconnecting the batteries in a circuit, while the springs 10, 16, 20, and 21 hold their respective batteries firmly against the bottom of the box, and thus prevent rattling. The bottom 26 of the box 1 is preferably positioned a slight distance above the lower edges of the sides and ends, as shown in Figs. 5 and 6, and its front edge rests upon a sill 27, extending from one end of the box to the other. Recesses 28 are formed in the front edge of the bottom 26, each recess extending back beneath one of the batteries. The sill is also provided with similar recesses 29 at points which coincide with the recesses 28 of the bottom, the latter recesses forming continuations of the former. These recesses permit a person's finger to be slipped in under the bottom of a battery, when by pressing the battery upward and at the same time pulling it forward it may be easily and quickly removed from the box. The box is closed by a door 30, which in practice is intended to press against the batteries, and thereby assist in preventing rattling. The lower edge of this door is provided with two or more pins 31, which project a slight distance therefrom, and when the door is closed upon the box these pins extend into recesses 32, formed in the sill 27, and thus secure the lower edge of the lid. The door is further secured to the box in the following manner: Upon each side of the door and at any desired distance from the top is secured an ear 33, one end of which extends a short distance beyond the edge of the door and is bifurcated, as shown at 34, Fig. 4. Upon each end of the box is secured a plate 35, having a forwardly-projecting integral threaded pin 36. These plates are secured at the forward side of the ends of the box and at points which coincide with the position of the ears 33 on the door, so that their threaded pins 36 will extend through the bifurcations 34 of the said ears when the door is in position upon the box, and in order to secure the door to the box thumb-nuts 37 are screwed upon the pins and against the ears, thus holding the door against accidental displacement and at the same time causing it to press against the batteries and prevent their rattling.

In Fig. 7 a slightly different arrangement of connecting the batteries is illustrated. A jacket 38 is employed which almost entirely surrounds the battery and is provided with a bottom 39, comprising a ledge or ring which will allow the jacket to spring when a battery is placed in it. The bottom also presents an additional contacting surface for the battery. The upper edge of each jacket has an integral ear 40, (see Fig. 13,) to which is pivotally attached a short arm or link 41, and to the upper end of this link is pivotally secured one end of a conductor-arm 42, which extends to the carbon of the adjacent battery, to which it is secured in any suitable manner, preferably by a bolt and nut. The link 41 will permit the arm 42 to be adjusted to meet any variation in distance between the jacket of one battery and the carbon of an adjacent battery, and this construction is preferable, though, if desired, it could be dispensed with and the arm attached directly to the ear 40 of the jacket, as shown in Fig. 7. In this form of my device the jacket of the first battery in the series is connected with a binding-post 43, and the batteries are connected in the manner above described or by the arms which connect the carbon of one battery with the jacket of the adjacent battery, and the carbon of the last battery of the series connects by a conductor-arm 44 with a plate 45, secured upon the box, to which a binding-post 46 is screwed. Wires (not shown) connect these posts with the piston-chamber of the engine, thus forming an electric circuit.

In Figs. 8, 9, 10, and 11 still another modification in the manner of connecting the batteries is illustrated. The jackets 47 are each provided with an upwardly-extending tongue 48, which is located diametrically opposite the open side of the jacket. Metal clips 49, the upper edges of which are substantially flush with the top of the box, are placed over the tongues of the jackets, except the last one in the series, and are suitably secured to the partitions of the compartments. The vertical edges of these clips are bent or curled upon themselves to form sockets 50, as clearly shown in Fig. 10, in which are inserted the ends of conductor-springs 51. These springs are preferably made of resilient wire, and in constructing them the wire is first bent to form a yoke of suitable width and length, and each member of the yoke, at a point about centrally of its length, is bent to form a plurality of coils 52, and the free ends are then bent down at right angles to the other part of the yoke and are inserted in the sockets 50, as previously stated. The opposite end of the yoke is bent up to form a grasping-loop 53, and upon the portion of the yoke adjacent to the loop 53 is secured a contact-plate 54. The springs extend from the clips 49 in one compartment over the battery-carbon in the adjoining compartment, and as their tension is downward the contact-plates are held against the carbon and the pressure of the spring will prevent rattling of the batteries. The first clip of the series is secured by a binding-post 55 to the end of the box, and a similar binding-post 56 connects with the last jacket of the series, and these posts are wired to the piston-chamber of the engine. By this construction the batteries are positively connected, and when a battery is to be removed for any purpose it is only necessary to hook the finger in loop 53 and pull the spring back, when the battery may be removed. The metal caps 6, which are preferably used, afford a smooth and even surface for the contact-plates as opposed to the rough and often uneven ends of the carbon, and are therefore a better conducting medium.

The device herein illustrated and described is simple and thoroughly practical, and while especially adapted for use in gasolene or other vapor operated automobiles it is applicable in any case where a series of batteries is employed.

What I claim as new, and desire to secure by Letters Patent, is—

1. In a battery-holder, a box comprising a plurality of compartments; a metal battery-surrounding jacket secured within each compartment; a conductor extending from the jacket of one compartment into the top of the adjoining compartment and a spring-pressed contact-plate connected to said conductor, substantially as described.

2. In a battery-holder of the character described, a box comprising a plurality of compartments; a metal battery-surrounding jacket secured within each compartment; a conductor secured upon one end of the box and extending into the first compartment; a spring upon said conductor and a contact-plate secured to said spring; a conductor extending from the jacket of each compartment into the upper end of the adjoining compartment, having a spring thereon, and a contact-plate secured to said springs; a binding-post contacting with the first conductor of the series, and a second binding-post contacting with the last jacket of the series, substantially as described.

3. In a battery-holder, the combination with a box comprising a plurality of compartments, and a battery in each compartment, of a metal jacket secured within each compartment partially surrounding the battery therein; a conductor forming an integral part of each jacket and extending into the top of the adjoining compartment; a coil-spring secured to the conductor and a contact-plate secured to the spring, which normally bears upon the carbon of the battery; a conductor secured to one end of the box having a spring and a contact-plate which engages the carbon of the first battery of the series; a binding-post upon said conductor and a binding-post in contact with the last jacket of the series, substantially as shown.

4. In a battery-holder, the combination with a box comprising a plurality of compartments and a battery in each compartment; of a spring-metal jacket secured within each compartment which partially surrounds the battery therein, said jacket being sprung when the battery is inserted therein so as to tightly clamp the same; an integral conductor upon each jacket which extends into the upper end of the adjoining compartment; a coil expansion-spring secured to said conductor, and a contact-plate secured to the spring which rests upon the carbon of the battery and is held positively against the same by the action of its spring, substantially as described.

5. In a battery-holder, the combination with a box comprising a plurality of compartments, of a spring-metal, battery-holding jacket, the said jacket being of a form to partially inclose a battery, but normally of less diameter so that it must be sprung when a battery is inserted; a conductor, comprising an integral plate which extends to the top of the box and then extends over into the adjoining compartment, a coil-spring secured at one end to the horizontal portion of the conductor; and a contact-plate secured to the other end of the spring, substantially as described.

6. In a battery-holder, the combination with a box comprising a plurality of compartments, each having a battery therein, of a spring-metal jacket which partially incloses the battery, said jacket having a bottom consisting of a flat metal ring which is open on one side corresponding with the open side of the jacket and thus permits the jacket to be sprung when a battery is inserted, and a conductor connecting the jacket of one battery with the carbon of an adjoining battery, substantially as described.

7. In a battery-holder, a box comprising a plurality of compartments, a removable door upon the front side of said box and means for securing said door so as to close the box; a sill beneath the lower edge of the door, a bottom the front edge of which rests upon the sill, the sill and bottom being recessed back from their front edge a short distance, at points centrally of the compartments; in combination with substantially semicircular spring-metal jackets, secured in the compartments, each having an integral conductor, which extends to the top of the compartment, and is bent at right angles to form a horizontal member which lies within the adjoining compartment; a coil expansion-spring secured to the under side of said horizontal portion of the conductor and a contact-plate secured to the other end of said spring, substantially as described.

8. In a battery-holder, a box having a plurality of compartments, a forwardly-projecting threaded pin secured upon each end of the box; a removable door forming one side of said box having an ear secured at each end thereof so as to project slightly beyond the ends of the door, said projecting ends being bifurcated to receive the threaded pins upon the ends of the box; a sill beneath the lower edge of the door having small recesses in its upper edge, and pins in the lower edge of the door which engage said recesses when the door is closed, said door being secured by thumb-nuts which screw upon the threaded pins and against the bifurcated ears; in combination with spring-metal, battery-inclosing jackets, which are secured within the partitions, each of said jackets having an integral conductor which extends into the adjoining compartment, and is provided with a spring-controlled contact-plate, substantially as shown.

9. In a battery-holder, the combination with a box comprising a plurality of compartments, each having a battery therein; of metal caps secured upon the carbons of said batteries; spring-metal jackets which partially surround said batteries and are secured within the compartments, conductors connecting the jacket in one compartment with the metal cap upon the battery-carbon in the adjoining compartment, said conductors having contact-plates which rest upon the caps; said contact-plates being spring-actuated, and act in conjunction with the spring-metal jackets, to hold the batteries against rattling, substantially as described.

10. In a battery-holder, a substantially cylindrical spring-metal jacket, which is open on one side from top to bottom; a conductor forming an integral part of said jacket and consisting of a plate which extends vertically a short distance from the upper edge of the jacket and is then bent at right angles to provide a horizontal portion, to the under side of which a coil-spring is secured, said spring having a contact-plate secured at its opposite end, substantially as described.

11. In a battery-holder, the combination with a series of batteries of a box therefor comprising a series of compartments, a substantially cylindrical resilient metal jacket, secured in each compartment, each jacket being open on one side from top to bottom, and adapted to tightly inclose one of the batteries; a conductor-plate which extends from each jacket to the top of the box, where it is bent at right angles to extend into the adjoining compartment and bear against the under side of the top of the box; an expansion-spring which is secured to the under side of the portion of the conductor, and a contact-plate secured to the spring which is thereby pressed upon the carbon of the battery in this compartment, so as to firmly hold said battery against the bottom of the box; a door for said box, and means for securing said door, so that it shall press against the batteries, substantially as shown.

12. In a battery-holder, the combination with a series of batteries, a box therefor, having a series of compartments, a resilient metal jacket inclosing each battery, and a conductor extending from each jacket to the battery-carbon in the adjoining compartment and having a spring-pressed contact-plate, of a metal cap for each carbon-point upon which the contact-plates bear, substantially as described.

In testimony whereof I affix my signature in presence of two witnesses.

FRANK JACKSON.

Witnesses:
G. SARGENT ELLIOTT,
BESSIE THOMPSON.